United States Patent [19]

Kovarik et al.

[11] Patent Number: 4,879,452
[45] Date of Patent: Nov. 7, 1989

[54] EXOTHERMIC WELDING APPARATUS AND METHOD

[75] Inventors: David P. Kovarik, Eastlake; Michael D. Amos, Burton, both of Ohio

[73] Assignee: Erico International Corporation, Solon, Ohio

[21] Appl. No.: 177,075

[22] Filed: Apr. 4, 1988

[51] Int. Cl.4 ............................................... B23K 23/00
[52] U.S. Cl. ................................. 219/130.4; 228/241
[58] Field of Search .................. 219/130.4; 102/202.8; 206/568; 228/241; 266/227; 361/251, 253, 256

[56] References Cited

U.S. PATENT DOCUMENTS

| | | | |
|---|---|---|---|
| 3,020,610 | 2/1962 | Rejdak | 228/241 |
| 3,099,813 | 7/1963 | Anderson | 102/202.8 |
| 3,298,306 | 1/1967 | Purdy | 102/202.8 |
| 3,955,505 | 5/1976 | Johnston | 102/202.8 |

FOREIGN PATENT DOCUMENTS 0028041 of 1905 United Kingdom ............. 102/202.8

*Primary Examiner*—Clifford C. Shaw
*Attorney, Agent, or Firm*—Renner, Otto, Boisselle & Sklar

[57] ABSTRACT

A self-contained and sealed package of exothermic welding material includes a cup-shape disposable ceramic container for such material which is closed at the top with a heat consumable cap. The bottom of the container includes a tap hole, the lower end of which is also closed with a formed cup-shape heat consumable disk. An insulated wire pair extends along an axial groove in the exterior of the container and through a radial groove through the lip of the cup beneath the cap. The end of the wire pair within the container has the insulation removed to form a spark gap which end extends at an angle away from the interior of the container and is embedded in the exothermic material. The ends of the wire pair outside the container have the insulation removed to a greater extent so that the wires can readily be bent and connected to power unit for generating a high energy spark at the gap. The package is mounted unopened on a seat on a refractory mold above a weld cavity which contains the parts to be welded and a hinged baffled mold cover closed. The wire pair having been bent to extend beneath the cover is connected to the spark generator. When the exothermic material is ignited the heat causes the package cap to be consumed and as the reaction proceeds the disk is consumed permitting the molten metal produced by the reaction to drop into the weld cavity. A major portion of the slag formed in the reaction remains in the ceramic container and is disposed of with the container while the refractory mold is reused.

38 Claims, 2 Drawing Sheets

EXOTHERMIC WELDING APPARATUS AND METHOD

DISCLOSURE

This invention relates generally as indicated to an exothermic welding apparatus and method and more particularly to a self-contained disposable package of exothermic material which can be ignited remotely, and its use.

BACKGROUND OF THE INVENTION

Cartridges or containers of exothermic welding material are normally plastic containers such as shown in prior U.S. Pat. No. 2,997,165. The contents of the container including the igniting material on the bottom are then emptied into a crucible of a graphite mold leaving the ignition material on top which can then be ignited by a flint gun, for example. The cartridges and molds noted are sold under the trademark CADWELD by Erico Products, Inc. of Solon, Ohio. Such cartridges require some manipulative steps in the field. Moreover, the exothermic process produces a slag which rises to the top of the molten metal formed. Since the molds are normally reused, the slag must be cleaned and removed. This in turn reduces the number of times the mold can be used.

For small quantities of exothermic materials, disposable ceramic molds have been employed with the cartridge such as shown in the above-noted patent actually shipped in the mold. Such molds are illustrated in U.S. Pat. No. 3,020,608 and are also sold under the trademark ONE SHOT by Erico Products, Inc. of Solon, Ohio. Nevertheless, the cartridge of material has to be removed from the crucible chamber of the mold, opened, and emptied into such chamber. In no sense does the cartridge of exothermic material remain sealed or contained until ignition.

In the copending application of Michael D. Amos, David P. Kovarik and George F. Kub, Jr. entitled "Exothermic Welding and Method", filed even date herewith, there is illustrated an ignition system for exothermic materials which does not require the use of low ignition starting materials and which uses a high energy spark aross a spark gap embedded in such exothermic material to obtain ignition. The spark is obtained from a power source using a capacitor discharge circuit. The present invention provides a sealed self-contained package using spark gap ignition providing economies of manufacture, distribution and use, and not requiring the material to be exposed prior to use. Moreover, the manner of use of the cartridge provides more reliable quality welds and increases the economic life of the molds employed.

SUMMARY OF THE INVENTION

A self-contained and sealed package of exothermic welding material includes a cup-shape disposable ceramic container for such material which is closed at the top with a heat consumable cap. The bottom of the container includes a tap hole, the lower end of which is also closed with a formed cup-shape heat consumable disk. An insulated wire pair extends along an axial groove in the exterior of the container and through a radial groove through the lip of the cup beneath the cap. The end of the wire pair within the container has the insulation removed to form a spark gap which end extends at an angle away from the interior of the container and is embedded in the exothermic material. The ends of the wire pair outside the container have the insulation removed to a greater extent so that the wires can readily be bent and connected to power unit for generating a high energy spark at the gap. The package is mounted unopened on a seat on a refractory mold above a weld cavity which contains the parts to be welded and a hinged baffled mold cover closed. The wire pair having been bent to extend beneath the cover is connected to the spark generator. When the exothermic material is ignited the heat causes the package cap to be consumed and as the reaction proceeds the disk is consumed permitting the molten metal produced by the reaction to drop into the weld cavity. A major portion of the slag formed in the reaction remains in the ceramic container and is disposed of with the container while the refractory mold is reused.

The invention also is a method of forming an exothermic weld comprising the steps of placing metal parts to be welded in a weld cavity of a reusable refractory mold, such mold having a tap hole extending upwardly to a seat, placing a self contained disposable package of exothermic welding material on such seat above such weld cavity, such package having a tap hole aligned with the tap hole of the mold, and igniting the exothermic material in such package to form molten weld metal to drop through such aligned tap holes to the weld cavity to weld such metal parts.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
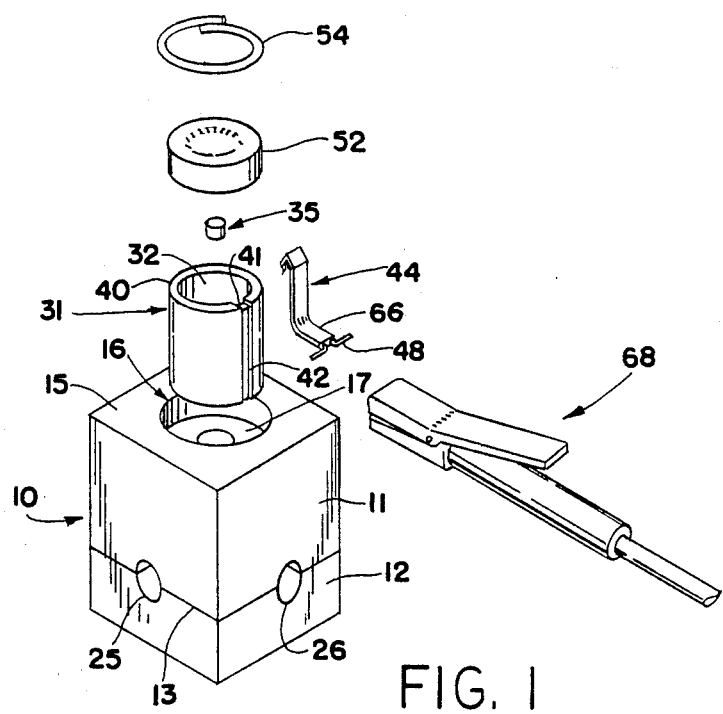
FIG. 1 is a partially exploded view of the mold and cartridge combination of the present invention.
Figure 6:
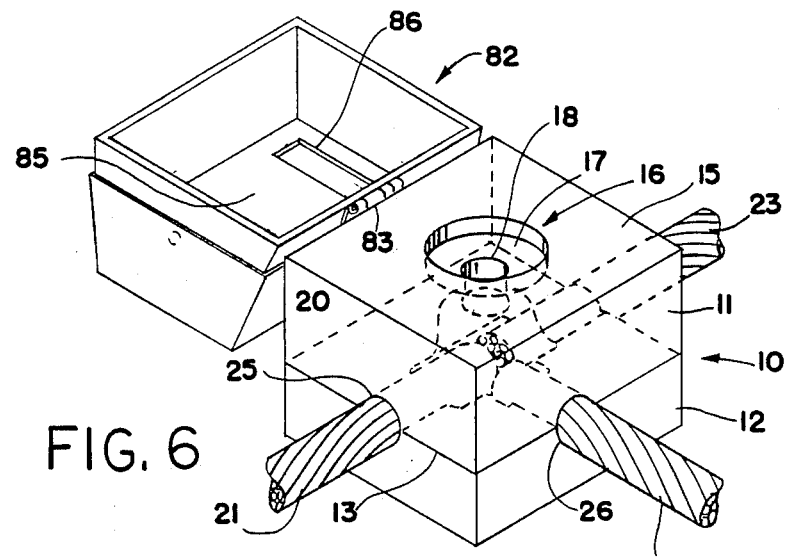
FIG. 6 is a isometric view of the mold ready to receive the cartridge with the mold cover open.
Figure 7:
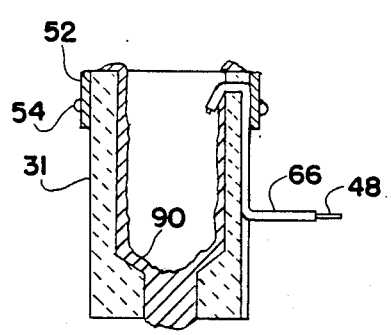
FIG. 7 is a sectional view of the to be discarded cartridge after use illustrating the slag nugget retained therein.

Referring now to the annexed drawings, and more particularly to FIGS. 1, 6 and 7, there is illustrated a refractory mold 10 made preferably of molded or machined graphite which includes an upper part 11 and a lower part 12. The parts of the mold may be assembled as indicated at the facing parting line 13 and held together by suitable clamps, not shown.

Figure 8:
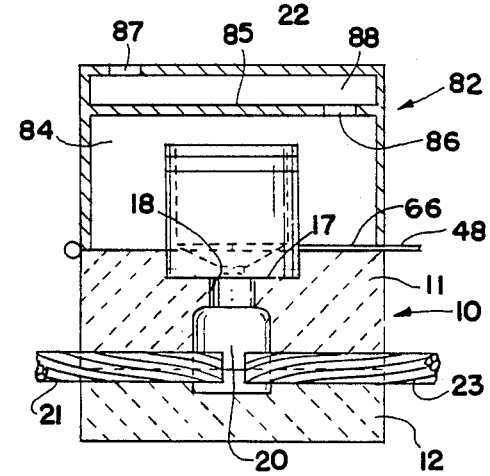
FIG. 8 is a vertical section of the assembled cartridge-mold combination with the mold cover closed; and, FIG. 9 is a schematic illustration of a capacitor discharge circuit which may be used to generate a high energy spark to ignite the exothermic material in the cartridge.

The top part 11 includes a top surface 15 in which is provided a cylindrical recess or seat 16. The seat includes a bottom annular horizontal surface 17 recessed below the top 15 and a tap hole 18 extends from the center of the surface 17 to weld cavity 20. The parts to be welded are indicated at 21, 22 or 23. Such parts to be welded fit closely within the openings seen at 25 or 26 formed in the opposed faces of the mold parts. The ends of the parts to be welded are cleaned and project into the weld cavity as indicated in FIG. 8.

Figure 2:
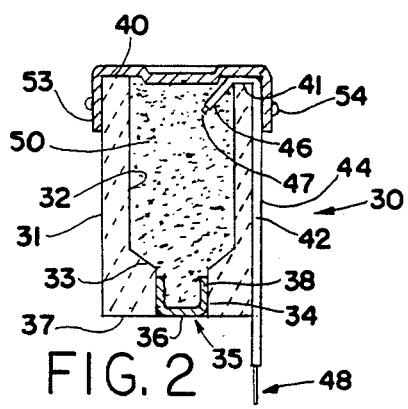
FIG. 2 is a somewhat enlarged vertical section through the assembled cartridge or package showing the ignition wire in elevation.
Figure 3:
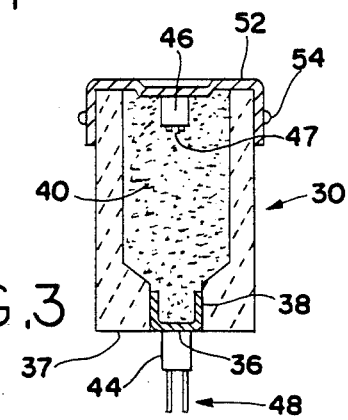
FIG. 3 is a similar section taken normal to the plane of FIG. 2 and looking to the right.

The seat 16 on the top of the assembled mold is designed to receive a sealed disposable package of exothermic material such as shown generally at 30 in FIGS. 2 and 3. The package 30 comprises a ceramic disposable cup-shape container 31 which forms a crucible 32 which tapers slightly at the bottom as seen at 33 to a tap hole 34 of some axial extent. The tap hole 34 is closed by a cup-shape metal disk 35 which may be formed into place such that the bottom 36 of the disk is flush with the bottom 37 of the container. The walls 38 of the cup-shape disk wedge against the interior vertical walls of the tap hole.

The lip 40 of the container is provided with a radial shallow slot 41 which joins an axial slot 42 on the exterior of the container. Positioned in such adjoining slots is an insulated wire pair 44. The wire pair extends upwardly along the slot 42 and then radially inwardly through the slot 41 and then extends downwardly at an angle of approximately 45° as indicated at 46 in the interior of the container. At the tip inside the container the insulation is removed from the wires to form a spark gap indicated generally at 47 in FIG. 3. The opposite end of the wire pair has the insulation removed from the two leads to a somewhat greater extent as indicated at 48 to facilitate connection to a spark generating device as hereinafter described.

The interior of the container is filled with exothermic material as indicated at 50. A measured quantity of such material is placed into the crucible of the container and is preferably vibratorily packaged so as to preclude further compaction or settlement during shipment or storage. A heat consumable cap 52 is then placed over the lip of the cup-shaped container, such cap including a skirt wrapped over the exterior of the container as indicated at 53. The cap is held in place by a wire cinch 54 which wraps around the skirt enclosing and sealing the container and also holding the wire pair 44 in place as illustrated.

The wire pair 44 is in the form of an inverted J-shape with the spark gap 47 extending away from the interior wall of the crucible of the container and also projecting down into the exothermic material to be embedded therein. In shipment the wire pair may extend as seen in FIGS. 2 and 3, but in operation the downwardly projecting end of the wire pair may be bent horizontally and the non-insulated ends splayed as seen in FIGS. 1, 4 and 5 to facilitate connection to a spark gap generator as hereinafter described.

Figure 4:
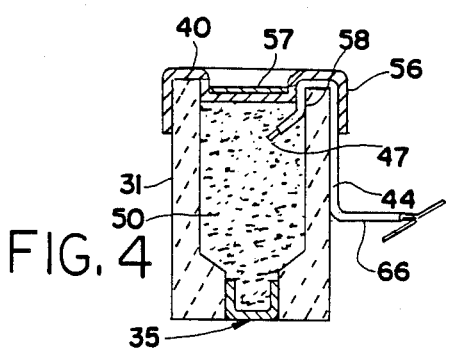
FIG. 4 is a section similar to FIG. 2 of a somewhat modified cartridge.

Referring now to FIG. 4 there is illustrated a package of exothermic material which is in most respects the same as the package 30 illustrated in FIG. 2. However, the cover or cap 56 is held in place by an internal snap ring 57 and the wire pair 44 internally includes a short vertical extent 58 which is also gripped by the ring with the cover or cap interposed between the ring and the wire pair.

Figure 5:
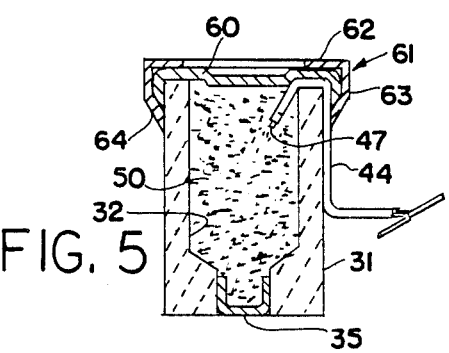
FIG. 5 is a similar section showing a further embodiment of the cartridge.

In the embodiment of FIG. 5 the cover or cap 60 may be held in place by a steel shroud 61 which includes a top radially inwardly directed flange 62 extending over the lip of the cup of the container with the cap interposed therebetween. The shroud includes a skirt 63, the lower end of which may be crimped as indicated at 64 to embrace the exterior of the container.

It is noted that the various embodiments of the cap or cover and the manner of holding the cap or cover in place also functions to secure the wire pair 44 in the proper position to prevent dislodgement so that the spark gap on the interior of the container remains properly embedded in the exothermic material.

It will of course be appreciated that the retainer ring or cinch may be omitted if the skirt of the cap is sufficiently tight, or if the cap is held in place by adhesive material either on the lip of the container or on the upper outer diameter of the container beneath the skirt. Also, the containers may themselves be shipped in shipping packages for multiple containers, which packages will have a lid or top flush with the top of the cap holding the cap in place thus obviating the requirement for a cinch.

Figure 9:
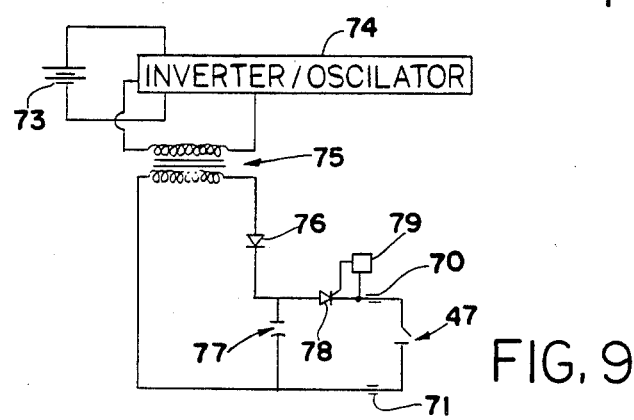

As indicated in FIGS. 1, 4 and 5, the slightly longer uninsulated leads 48 on the exterior of the container may be splayed or bent to extend in opposite directions and the lower end of the wire pair may be bent to extend horizontally as seen at 66. This permits the ready connection of a spark generator to the wire pair such as through the alligator type clip shown generally at 68 in FIG. 1. As seen in FIG. 9, the spring loaded alligator type clip or clamp forms the connections 70 and 71 from the spark gap generating circuit to the spark gap 47. As seen in such Figure such circuit may comprise a battery 73 such as a 6 volt battery which is connected to an inverter or oscillator 74 which converts the DC current to a high frequency AC current. The output of the inverter then passes through a step-up transformer seen at 75 which converts the 6 volt AC current to approximately 450 volts. The high voltage AC current is then passed through a rectifier 76 (full wave or half wave) to convert the AC current back to DC current. The DC current then charges a capacitor 77. When switch 78 is closed a high energy spark is formed at the spark gap 47. The switch 78 may be a mechanical or solid state switch. If solid state, the switch is closed by gate firing circuit 79.

In operation the parts to be welded are cleaned and placed in the mold as seen in FIGS. 6 and 8 and the mold parts are then locked together. The ends to be welded of course extend into the weld cavity of the reusable refractory mold 10. The package 30 is then positioned in the closely fitting seat on top of the mold above the weld cavity such that the tap hole 34 of the package is aligned with the tap hole 18 of the mold. The lower end of the wire pair is bent to extend horizontally as indicated at 66 and the uninsulated ends are splayed to facilitate connection through the alligator connector to the spark generating circuit.

As indicated in FIGS. 6 and 8 the mold includes a cover shown generally at 82 which may be hinged to the top of the mold as seen at 83. The cover when closed forms with the top of the mold a relatively sizeable chamber 84 which clears the top of the package 30. The cover includes an interior wall or baffle plate 85 which includes an offset opening 86. The top of the cover also forms a baffle plate 87 which has an oppositely offset opening 87. Thus, the effluent from the reaction products of the exothermic mixture will exit first into the chamber 84 and through the opening 86 into the baffle chamber 88 and finally through the opening 87. It will be appreciated that additional baffle chambers may be provided. The baffling and delay of the discharge of the effluent has been found to reduce the amount of smoke which is created. With the wires positioned as seen in FIG. 8, the spark generating device is connected to the wires and when the switch 78 is closed a high energy spark is created at the spark gap which is embedded in the matrix of exothermic material. Such material is then ignited and the reaction proceeds.

Because the cap 52 is heat consumable, it will quickly be consumed permitting the exit of smoke and effluent from the container into the chamber 84 and through the baffle openings to atmosphere. As the reaction proceeds downwardly in the crucible, the exothermic material will be converted to molten metal and slag with the lighter weight slag rising to the top while the heavier molten metal drops to the bottom of the crucible chamber. When the molten metal is fully in contact with the disk 35 it then is consumed and the molten metal drops into the mold tap hole and into the weld chamber 20.

As seen in FIG. 7 after the reaction has been completed and the molten metal has dropped into the weld cavity the interior of the container 30 will contain a substantial amount of slag indicated generally at 90 which will adhere to the interior of the container. Both the cap and disk have been consumed and the slag nugget thus formed is disposed of with the container. This reduces the amount of slag which drops into the weld cavity and results in less cleaning or treatment of weld and also the mold for reuse. In this manner the molds have a longer service life.

A variety of exothermic reaction mixtures may be packaged and sold as illustrated. Typical such mixtures are a compound of a transition metal oxide and a reductant metal such as copper oxide and aluminum or iron oxide and aluminum. When the mixture is properly ignited it produces sufficient heat to sustain and propagate a reaction in the mixture. The products of the reaction are then used or the heat from the reaction is used to produce the desired weld or result. For example, the reaction between iron oxide and aluminum in the process produces super heated molten iron and aluminum oxide. The molten iron of higher density drops down to consume the disk and then drops into the weld cavity. The lighter aluminum oxide or slag is then broken off or discarded. For welding, particularly electrical conductors, the exothermic copper-based material is preferred although exothermic iron-based, tin-based, nickel-based, or other metal-based materials canalso be packaged in the same manner for such remote electrical ignition.

The container of the package is preferably a ceramic material of fired clay or other refractory material such as disclosed in the aforenoted U.S. Pat. No. 3,020,608. However, ceramic coated materials may be employed for such container. The disk at the bottom of the tap hole of the container is preferably steel or an iron-base metal although copper or copper-base metal may be employed.

The ignition wire pair are preferably small diameter copper wires which may be insulated throughout their major length by common insulation. However, copper-based wire, steel, iron-based wire, or solid aluminum wire my be employed.

The heat consumable cap for the package is preferably copper foil having a thickness of from about 0.001 to 0.004 inches. However other metal foils such as aluminum or steels, some plastics or even paper may be employed as long as it has the thickness to contain the integrity of the sealed package, and yet the thinness to be consumed quickly without contaminating the mixture. It will also be appreciated that other types of cap or cover retaining devices may be employed with the package.

It can now be seen that there is provided a sealed, self-contained package of exothermic material which does not have to be opened prior to ignition and use, thus reducing the amount of material handling by the user. Moreover, the amount of the material can carefully be metered and the method of the present invention reduces the amount of mold material required and provides a longer service life for such molds.

We claim:

1. A sealed package of exothermic welding material comprising a cup-shape ceramic container for such material, a heat consumable cap over the top of said container, a tap hole in the bottom of said container closed by a heat consumable disk, and a pair of insulated ignition wires extending from the exterior of the container to the interior of the container and having exposed spaced ends forming a spark gap embedded in the exothermic material.

2. A package as set forth in claim 1 including a radial groove in the lip of said container through which said wire pair passes.

3. A package as set forth in claim 2 including an axial groove on the exterior of said container in which said wire pair is seated.

4. A package as in claim 2 wherein the end of said wire pair opposite said spark gap has the insulation removed therefrom for a substantial extent to facilitate the connection of a spark producing power source thereto.

5. A package as set forth in claim 2 wherein said wire pair is bent in the form of an inverted J-shape with the short leg of the J extending interiorly of the container and including the spark gap embedded in the exothermic material.

6. A package as set forth in claim 5 wherein the short leg of the J extends inwardly at an angle to space the spark gap away from the interior of the container.

7. A package as set forth in claim 1 wherein said heat consumable cap is wrapped over the top of said container.

8. A package as set forth in claim 7 wherein said cap is in the form of metal foil wrapped over the lip of the cup, and a cinch encircling that portion of the cap wrapped over the lip.

9. A package as set forth in claim 8 wherein said cinch is a wire.

10. A package as set forth in claim 8 wherein said cinch is in the form of a flanged steel shroud.

11. A package as set forth in claim 10 wherein said shroud includes a radial flange overlying the lip of the container and the cap, and an axial flange crimped against the exterior of the container.

12. A package as set forth in claim 7 wherein said cap is held in place by adhesive.

13. A package as set forth in claim 1 wherein said heat consumable cap is retained on said container by a retainer just inside the lip of the container.

14. A package as set forth in claim 13 wherein said retainer is a retaining ring extending between said cap and the inside of the container.

15. A package as set forth in claim 1 including a cinch encircling said container holding said wire pair in place.

16. A package as set forth in claim 1 wherein said tap hole is of some axial extent, and said heat consumable disk is in the form of a cup with the bottom of the cup substantially flush with the bottom of said container.

17. A package as set forth in claim 16 wherein the walls of the cup formed disk wedge against the walls of the tap hole holding the disk in place.

18. A self contained package of exothermic welding material comprising a disposable ceramic cup-shape container, exothermic welding material within said said container, heat consumable cap over the top, said cap sealing said material in said container, a tap hole in the bottom of said container, a heat consumable disk closing said tap hole, and electrical ignition means for igniting said material in the interior of the package.

19. A package as set forth in claim 18 including in combination therewith means for energizing said ignition means from the exterior of said package.

20. A package as set forth in claim 19 including a pair of wires extending from the exterior of the package to the interior of the package and forming a spark gap embedded in the material.

21. A package as set forth in claim 20 including in combination a high energy spark generator connected to said pair of wires to generate a spark at such gap to ignite such material.

22. A package combination as set forth in claim 21 wherein said generator comprises a capacitor discharge circuit.

23. In combination, a refractory mold adapted to receive metal parts to be welded in a weld cavity, a seat above said chamber and a tap hole extending from said seat to said weld cavity, a self-contained package of exothermic material mounted on said seat and including a tap hole in the bottom thereof aligned with said first-mentioned tap hole, a heat consumable disk closing said second mentioned tap hole which is consumed upon ignition of such exothermic material to permit the molten reaction products to pass through the tap holes into the weld cavity.

24. The combination set forth in claim 23 wherein said mold includes a cover extending over the top of said package.

25. The combination set forth in claim 24 wherein said cover forms a chamber to retain effluent from said package when said material is ignited.

26. The combination set forth in claim 24 wherein said cover includes a baffle to delay and minimize the escape of effluent therefrom.

27. The combination set forth in claim 26 wherein said cover is hinged to said mold.

28. The combination set forth in claim 23 wherein said package comprises a cup-shape ceramic container for such material, and a heat consumable cap over the top of said container.

29. The combination set forth in claim 28 including a pair of ignition wires extending from the exterior of said container to the interior of said container and having exposed spaced ends forming a spark gap embedded in the exothermic material.

30. The combination set forth in claim 29 including a radial groove in the lip of said container through which said wire pair passes.

31. The combination set forth in claim 30 including an axial groove on the exterior of said container in which said wire pair is seated.

32. The combination set forth in claim 30 wherein the end of said wire pair opposite said spark gap has the insulation removed therefrom for a substantial extent to facilitate the connection of a spark producing power source thereto.

33. The combination set forth in claim 30 wherein said wire pair is bent in the form of an inverted J-shape with the short leg of the J extending interiorly of the container and including the spark gap embedded in the exothermic material.

34. The combinatin set forth in claim 33 wherein the short leg of the J extends inwardly at an angle to space the spark gap away from the interior of the container.

35. The combination set forth in claim 29 including a high energy spark generator connected to said pair of wires to generate a spark at such gap to ignite such material.

36. The combination set forth in claim 35 wherein said generator comprises a capacitor discharge circuit.

37. The combination set forth in claim 28 wherein said second mentioned tap hole is of some axial extent, and said heat consumable disk is in the form of a cup with the bottom of the cup substantially flush with the bottom of said container.

38. The combination set forth in claim 37 wherein the walls of the cup formed disk wedge against the walls of the tap hole holding the disk in place.

* * * * *